(12) United States Patent
Kim et al.

(10) Patent No.: US 9,159,143 B2
(45) Date of Patent: Oct. 13, 2015

(54) APPARATUS AND METHOD FOR GENERATING CHARACTER COLLAGE MESSAGE

(75) Inventors: Jung-Rim Kim, Suwon-si (KR);
Sang-Hoon Sull, Seoul (KR);
Soon-Hong Jung, Seongnam-si (KR);
Eun-Heui Cho, Seoul (KR)

(73) Assignees: Samsung Electronics Co., Ltd. (KR);
Korea University Research and Business Foundation (KR)

( * ) Notice: Subject to any disclaimer, the term of this patent is extended or adjusted under 35 U.S.C. 154(b) by 390 days.

(21) Appl. No.: 13/222,648

(22) Filed: Aug. 31, 2011

(65) Prior Publication Data
US 2012/0051633 A1 Mar. 1, 2012

(30) Foreign Application Priority Data

Aug. 31, 2010 (KR) ........................ 10-2010-0084813

(51) Int. Cl.
*G06K 9/18* (2006.01)
*G06T 11/00* (2006.01)

(52) U.S. Cl.
CPC ...................... *G06T 11/00* (2013.01)

(58) Field of Classification Search
CPC ....... G06K 9/18; G06K 9/186; G06K 9/4652; G06K 2209/01; G06K 9/346; G06T 7/0081
USPC .................. 382/182, 164, 177, 100
See application file for complete search history.

(56) References Cited

U.S. PATENT DOCUMENTS

| 6,285,471 | B1 | 9/2001 | Pornbacher | |
|---|---|---|---|---|
| 7,035,803 | B1 | 4/2006 | Ostermann et al. | |
| 7,330,100 | B2 | 2/2008 | Yu | |
| 7,671,861 | B1 | 3/2010 | Ostermann et al. | |
| 7,711,211 | B2 | 5/2010 | Snowdon et al. | |
| 2006/0215911 | A1* | 9/2006 | Ashikaga et al. | 382/190 |
| 2007/0110335 | A1 | 5/2007 | Taylor et al. | |
| 2008/0189609 | A1 | 8/2008 | Larson et al. | |
| 2008/0205694 | A1 | 8/2008 | Sagoo et al. | |

FOREIGN PATENT DOCUMENTS

| KR | 1020010016442 | 3/2001 |
|---|---|---|
| KR | 1020010034987 | 5/2001 |
| KR | 1020020062061 | 7/2002 |
| KR | 1020040024382 | 3/2004 |
| KR | 1020090000577 | 1/2009 |
| KR | 1020090088434 | 8/2009 |
| KR | 1020090102827 | 9/2009 |
| KR | 1020100136133 | 12/2010 |

* cited by examiner

Primary Examiner — Ruiping Li
(74) Attorney, Agent, or Firm — The Farrell Law Firm, P.C.

(57) ABSTRACT

A method and apparatus are provided for generating a character collage message. A character is recognized from an image. A region is extracted from the image to create a character image. The region includes the recognized character. The created character image is stored in a memory. At least the character image is output to an output unit as the character collage message in accordance with input of one or more characters through an input unit. At least one of the one or more characters corresponds to the character image, and the character image is output to the output unit as a substitute for the at least one of the one or more characters.

36 Claims, 19 Drawing Sheets

| | CHARACTER | IMAGE | | |
|---|---|---|---|---|
| | | DEFAULT IMAGE | | |
| 1 | MEDICINE | MEDICINE | *MEDICINE* | MEDICINE |
| 2 | DREAM | DREAM | DREAM | DREAM |
| 3 | WEDNESDAY | *WEDNESDAY* | | |
| 4 | SLEEP-TALKING | 'LEEP-TALKING' | | |

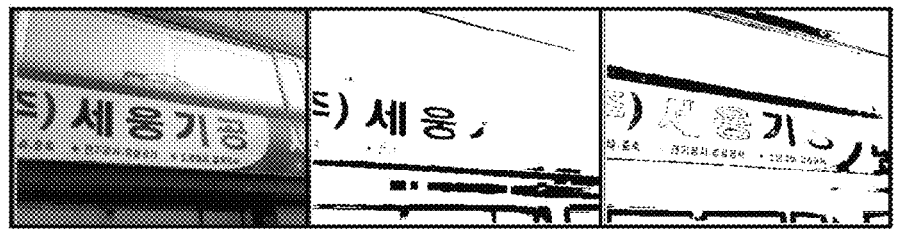
FIG.8A     FIG.8B     FIG.8C
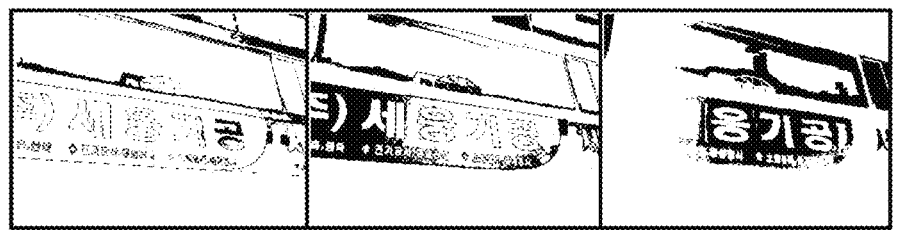
FIG.8D     FIG.8E     FIG.8F
FIG.9A
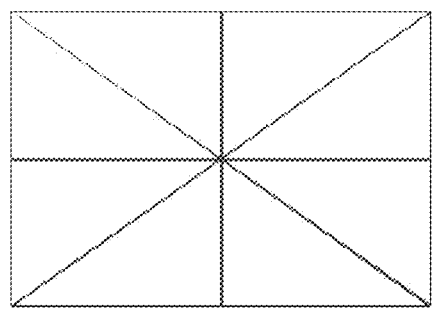
FIG.9B
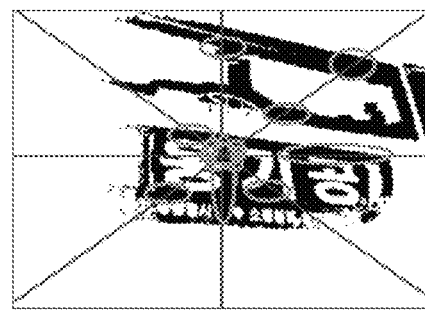

FIG.10A   FIG.10B
FIG.10C   FIG.10D
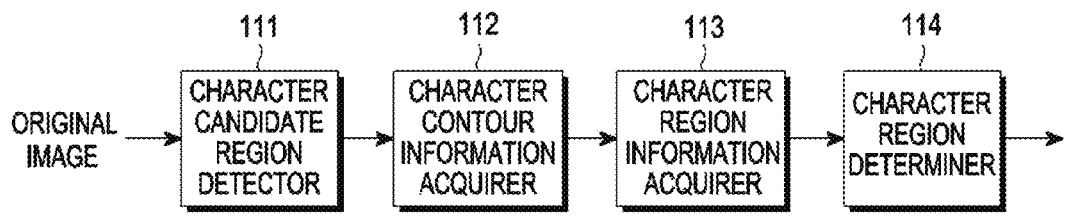
FIG.11

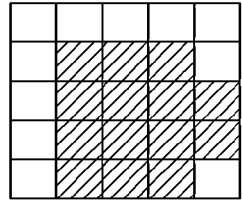
FIG.12A
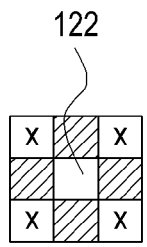
AND
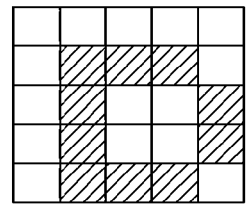
FIG.12B   FIG.12C   FIG.12D
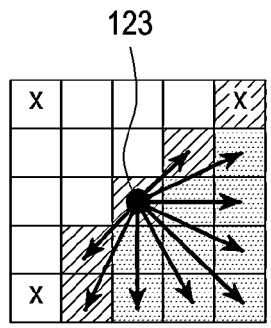
FIG.12E
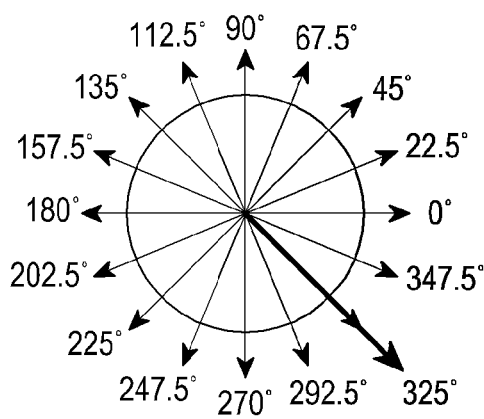
FIG.12F

APPARATUS AND METHOD FOR GENERATING CHARACTER COLLAGE MESSAGE

PRIORITY

This application claims priority under 35 U.S.C. §119(a) to an application entitled "Apparatus and Method for Generating Character Collage Message" filed in the Korean Intellectual Property Office on Aug. 31, 2010, and assigned Serial No. 10-2010-0084813, the contents of which are incorporated herein by reference.

BACKGROUND OF THE INVENTION

1. Field of the Invention

The present invention relates generally to an apparatus and method for generating a character collage message, and more particularly to an apparatus and method for generating a character collage message by using images, each of which includes a character.

2. Description of the Related Art

In general, messaging services used in portable terminals include a Short Message Service (SMS), a Long Message Service (LMS), and a Multimedia Message Service (MMS). The SMS and LMS are most frequently used by the users of portable terminals, but can be considered monotonous because the resulting messages are characteristically expressed only by text. To make up for the defects of these text-based message services, the MMS has been proposed and used. The MMS can transmit not only texts, but also images, web pages, and moving pictures as attached files. Thus, a user of a portable terminal can compose a personalized message and transmit the message to the user of a counterpart portable terminal.

Collage is a technique of pasting pieces, cut from papers, prints, photos, etc., on a picture to create a specific shape and/or message. A character collage message refers to a message that is composed of a combination of images, including respective characters, by using the collage technique, instead of a message composed by typical text characters. Conventionally, in order to compose a character collage message, a user creates an image file using a separate image editing program. Specifically, a user must perform complex steps of copying image pieces corresponding to respective syllables from a plurality of original images, pasting the copied image pieces on one image to create one collage image file, and then importing the created collage image file into an MMS program to transmit it to the user of a counterpart portable terminal. Moreover, in a common portable terminal that has no image editing program, in contrast to a smartphone, it is difficult to even create a collage image file. Accordingly, it is arduous to have to create a collage image file in an external computer, download the created collage image file to the portable terminal, and then transmit the downloaded collage image file.

SUMMARY OF THE INVENTION

The present invention has been made to address at least the above problems and/or disadvantages and to provide at least the advantages described below. Accordingly, an aspect of the present invention provides an apparatus and method for generating a character collage message by automatically recognizing a character from an image, extracting a corresponding character region, and replacing the corresponding character when a user inputs the character.

In accordance with an aspect of the present invention, an apparatus is provided for generating a character collage message. The apparatus includes a character recognizer for recognizing a character from an image. The apparatus also includes a character image generator for extracting a region from the image to create a character image. The region includes the recognized character. The apparatus additionally includes a memory for storing the created character image. The apparatus further includes a controller for outputting at least the character image to an output unit as the character collage message in accordance with input of one or more characters through an input unit. At least one of the one or more characters corresponds to the character image, and the character image is output to the output unit as a substitute for the at least one of the one or more characters.

In accordance with another aspect of the present invention, a method is provided for generating a character collage message. A character is recognized from an image. A region is extracted from the image to create a character image. The region includes the recognized character. The created character image is stored in a memory. At least the character image is output to an output unit as the character collage message in accordance with input of one or more characters through an input unit. At least one of the one or more characters corresponds to the character image, and the character image is output to the output unit as a substitute for the at least one of the one or more characters.

BRIEF DESCRIPTION OF THE DRAWINGS

The above and other aspects, features and advantages of the present invention will be more apparent from the following detailed description when taken in conjunction with the accompanying drawings, in which:

FIG. 8 is a diagram illustrating a procedure of outputting a plurality of binary maps according to similar colors in a binary map generator, in accordance with an embodiment of the present invention;

FIG. 9 is a diagram illustrating a procedure of selecting an image including a background region along scan lines in a background region determiner, in accordance with an embodiment of the present invention;

FIG. 10 is a diagram illustrating a procedure of creating an image including a character region in a character region extractor, in accordance with an embodiment of the present invention;

FIG. 11 is a block diagram illustrating a detailed configuration of a character recognizer for character extraction, in accordance with an embodiment of the present invention;

FIG. 12 is a diagram illustrating a procedure of extracting a character contour and setting character contour information for the extracted character contour by a character contour information acquirer, in accordance with an embodiment of the present invention;

FIG. 13 is a diagram illustrating a procedure of setting a character stroke width and a character stroke angle in each pixel constituting a character contour by a character region information acquirer in accordance with an embodiment of the present invention;

DETAILED DESCRIPTION OF EMBODIMENTS OF THE PRESENT INVENTION

Figure 1:
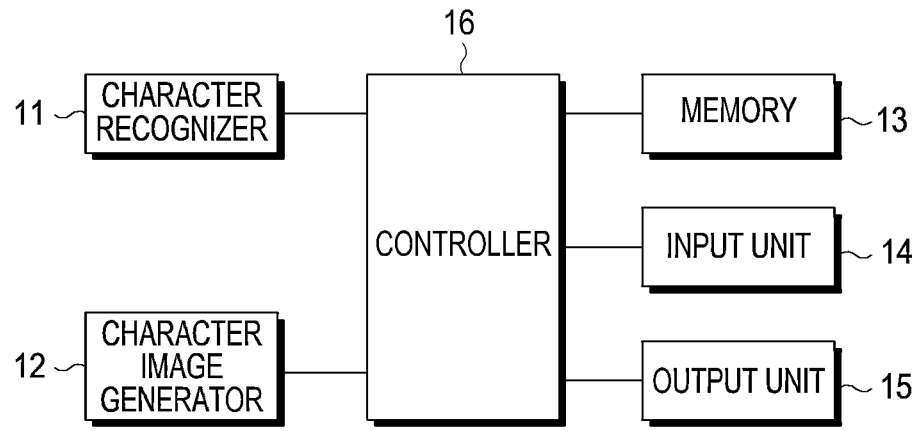
FIG. 1 is a block diagram illustrating a configuration of an apparatus for generating a character collage message, in accordance with an embodiment of the present invention.

Embodiments of the present invention are described in detail with reference to the accompanying drawings. The same or similar components may be designated by the same or similar reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, detailed descriptions of constructions or processes known in the art may be omitted to avoid obscuring the subject matter of the present invention.

FIG. 1 is a diagram illustrating an apparatus for generating a character collage message, according to an embodiment of the present invention.

As shown in FIG. 1, the apparatus for generating a character collage message according to this embodiment of the present invention includes a character recognizer 11, a character image generator 12, a memory 13, an input unit 14, an output unit 15, and a controller 16.

The character recognizer 11 recognizes a character from an image that includes the corresponding character. Specifically, the character recognizer 11 automatically detects a region in which a character exists from the image that includes the character. The character recognizer 11 extracts information about the character in the detected region to recognize the meaning of the corresponding character. The image may be any one of an image stored in the memory 13, an image received from an external device, an image photographed using an internal imaging device, and the like. As used herein, the term "character" includes all characters for expressing different languages, such as Korean, English, Chinese, and Japanese, and all symbols and signs, such as question marks and exclamation points. The embodiments of the present invention may utilize various character recognition methods. A character recognition method according to an embodiment of the present invention will be described in detail below, by way of example only.

The character image generator 12 extracts a region that includes the recognized character from the image to create a character image. The extracted region completely includes at least the outline of the corresponding character, and preferably has a margin around the outline of the corresponding character so as to ensure legibility of the corresponding character. As will be described below, the created character image may correspond to a monosyllabic character or a polysyllabic character, such as a word.

The memory 13 may store general programs and applications for operating this embodiment of the present invention for generating a character collage message. Further, the memory 13 stores character images that are created by the character image generator 12, according to an embodiment of the present invention.

The input unit 14 receives a character input from a user. As described above, the character may be selected from all characters for expressing different languages, and all symbols and signs.

The output unit 15 displays the typical operating states of the apparatus, and outputs a character input, through a keypad or keyboard, by a user, and a character image corresponding to the input character. The output unit 15 may be embodied as a Liquid Crystal Display (LCD), an Organic Light Emitting Diode (OLED), or the like. The output unit 15 together with the input unit 14 may be integrated into a touch screen.

The controller 16 controls the character recognizer 11, the character image generator 12, the memory 13, the input unit 14, and the output unit 15 in order to operate the apparatus. According to an embodiment of the present invention, the controller 14 outputs a plurality of characters, which are input through the input unit 14, to the output unit 15, and replaces at least some of the plurality of characters, which correspond to character images stored in the memory 13, with the character images. The character images are then substituted for the at least some of the plurality of characters when output to the output unit 15. If the character recognizer 11 fails to automatically recognize a character and thus cannot determine the meaning of the corresponding character, then the controller 16 may control the apparatus in such a manner as to allow a user to manually recognize the corresponding character and match the recognized character to a corresponding character image.

There may be several character images corresponding to the recognized character. When a plurality of character images correspond to one character, the controller 16 may control the apparatus to allow a user to select any one of the plurality of character images. The selected character image is output as a substitute for the corresponding character when the corresponding character is input. Alternatively, the controller 16 may provide a user with a selection menu through the output unit 15, thereby allowing the user to select any one of the plurality of character images and replace an input character by the selected character image.

Figure 2:
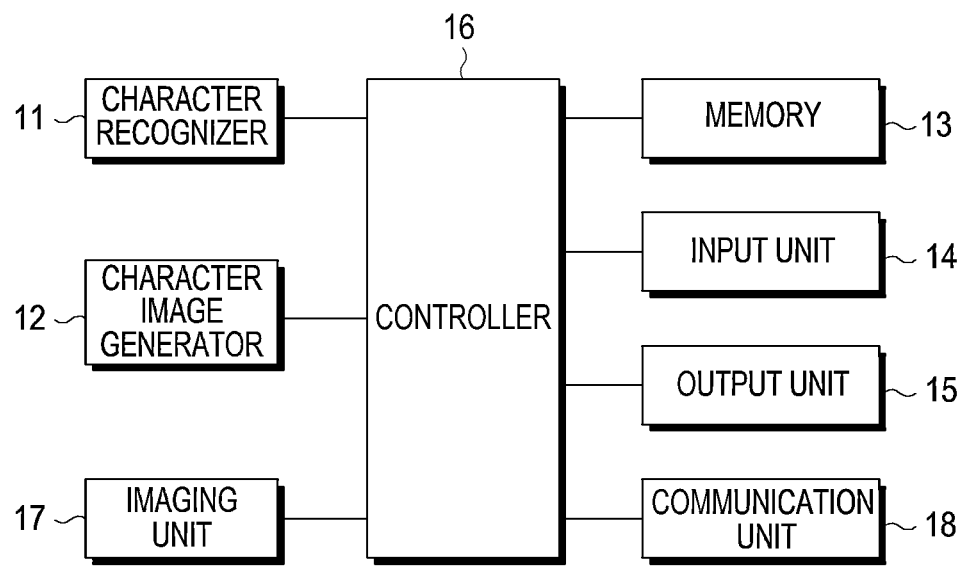
FIG. 2 is a block diagram illustrating a configuration of an apparatus for generating a character collage message, in accordance with another embodiment of the present invention.

FIG. 2 is a diagram illustrating an apparatus for generating a character collage message according to another embodiment of the present invention.

As shown in FIG. 2, the apparatus for generating a character collage message according to this embodiment includes an imaging unit 17 and a communication unit 18, in addition to the elements of the embodiment described with reference to FIG. 1.

The imaging unit 17 may include a digital camera module for photographing an image that includes a character. Since an image that includes a character is photographed in the apparatus, a printing type with a small font size may be photographed. The imaging unit 17 preferably has a zoom function so that appropriate character recognition capability can be ensured even when a small printing type is photographed.

The communication unit 18 is responsible for transmission and reception of voice data, character data, image data, and control data under the control of the controller 16. The communication unit 18 includes an RF transmitter for up-converting the frequency of a transmitted signal and amplifying the up-converted transmitted signal. The communication unit also includes an RF receiver for low noise-amplifying a received signal and down-converting the frequency of the amplified received signal, an antenna for signal transmission and reception, and the like. Using the communication unit 18, this embodiment of the present invention can transmit/receive a generated character collage message to/from another apparatus.

Figures 3, 4:
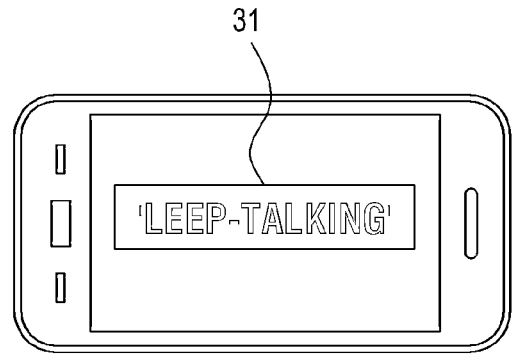
FIG. 3 is a diagram illustrating character recognition, in accordance with an embodiment of the present invention.
FIG. 4 is a diagram illustrating character images corresponding to respective characters, according to an embodiment of the present invention.

FIG. 3 is a diagram illustrating character recognition, according to an embodiment of the present invention.

As shown in FIG. 3, a character is recognized in an image that includes the corresponding character. Character recognition may be performed by various methods, but the embodiments of the present invention employ a method that strengthens character recognition capability by extracting a corresponding character region 13 and calculating a character stroke width from the character region to recognize the character. Such a method for character detection and recognition is described in greater detail below with reference to FIG. 6. Once the character is recognized from the image, a character region including the recognized character is appropriately selected and extracted from the image. In selecting the character region, from an aesthetic point of view and in view of improved legibility, it is advantageous to select a character region with an appropriate margin left around the outline of the character.

Since extracted character images have different sizes, they may be resized to a size suitable to generate a character collage message. The size of a character image may be appropriately set in consideration of the processing speed of the inventive apparatus, the capacity of the memory 13, and the aesthetic sensibility when a character collage message is generated. Further, in order to improve the legibility of a character image when the character image is resized, brightness and contrast may be adjusted. Subsequently, the extracted character image corresponds to the pertinent character.

FIG. 4 is a diagram illustrating character images corresponding to respective characters, according to an embodiment of the present invention.

As shown in FIG. 4, a plurality of character images may correspond to one character. In order to prevent confusion between the plurality of character images when a character input from a user is to be replaced by a character image, one of the plurality of character images is set as a default character image. When the corresponding character is subsequently input, the default character image is preferentially output.

New character images, which are extracted from character collage messages exchanged through communication between apparatuses, may be added to the character images corresponding to the respective characters as shown in FIG. 4.

Figure 5:
FIG. 5 is a diagram illustrating a character collage message composed in accordance with an embodiment of the present invention.

FIG. 5 is a diagram illustrating a character collage message composed according to an embodiment of the present invention.

As shown in FIG. 5, if a character corresponding to a character image is input by a user, the inventive apparatus automatically outputs the character image as a substitute for the character input by the user. The character collage message may be transmitted to a counterpart apparatus through the communication unit 18 in various ways. For example, the generated character collage message may be created as a single image file, and the created image file may be transmitted in the same manner as the existing MMS. Also, the generated character collage message may be transmitted and received between users using an application for character collage message exchange.

The apparatus for generating a character collage message is advantageous in that it can easily and conveniently generate and transmit a personalized character collage message. For example, when a character collage message generated according to the embodiments of the present invention is exchanged in order to notify of a meeting place, visual information can be advantageously delivered through a character image representing the actual image of the signboard in the meeting place.

Further, upon receiving a character collage message, a called portable terminal stores character images constituting the received character collage message and matches them to the corresponding characters. Subsequently, the user of the called portable terminal can reuse the stored character images when he/she generates a character collage message. Accordingly, service industry employees or product marketers can utilize character collage messages as a means for public relations.

When a character image within a character collage message is linked to a specific web address, it is possible to connect a portable terminal, such as a smartphone, to the linked web site by selecting (for example, clicking) the corresponding character image.

Figure 6:
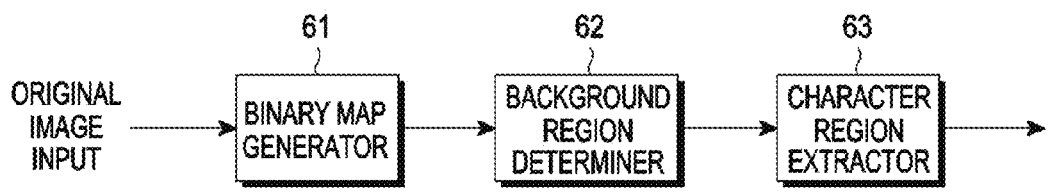
FIG. 6 is a block diagram illustrating a detailed configuration of a character recognizer for character extraction, in accordance with an embodiment of the present invention.

FIG. 6 illustrates a detailed configuration of the character recognizer 11 for character extraction, according to an embodiment of the present invention.

As shown in FIG. 6, the character recognizer 11 includes a binary map generator 61, a background region determiner 62, and a character region extractor 63.

The binary map generator 61 divides an image, which includes a character, into blocks of a predetermined size, calculates an RGB variance for each block, and creates a character candidate image by using the calculated RGB variance.

Figures 7A, 7B:
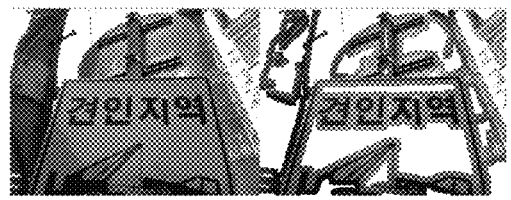
FIG. 7 is a diagram illustrating a procedure of creating a character candidate image in a binary map generator, in accordance with an embodiment of the present invention.
Figures 7C, 7D:
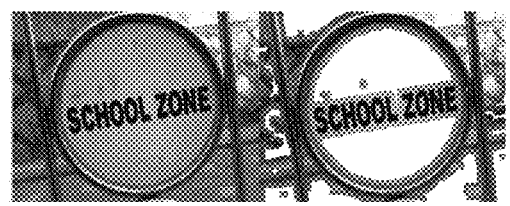

Specifically, if an image including a character is input, then the binary map generator 61 divides the image into unit blocks of a predetermined size, and calculates an RGB variance for each unit block. When the RGB variance calculated for any one of the unit blocks is greater than a predetermined threshold value, the binary map generator 61 creates a character candidate image corresponding to the image, from which the corresponding block is excluded. Accordingly, the binary map generator 61 creates a character candidate image by removing the unit blocks with RGB variances greater than a predetermined threshold value from the image. For example, when images including a character as shown in FIGS. 7A and 7C are input, the binary map generator 61 outputs images as shown in FIGS. 7B and 7D through this process.

The binary map generator 61 creates binary maps according to color regions with a similar color by calculating a difference between color values for all pixels of the character candidate image.

The binary map generator 61 creates a color table by mapping a corresponding color and its RGB value to each of a plurality of seed points.

For example, it is assumed that a color table, as shown in Table 1 below, is created by mapping eight colors of black, white, red, green, blue, yellow, pink, and sky blue, and their RGB values to seed points 1 to 8 respectively.

TABLE 1

| Seed Point | R | G | B | Color |
|---|---|---|---|---|
| 1 | | | | black |
| 2 | 55 | 55 | 55 | white |
| 3 | 55 | | | red |
| 4 | | 55 | | green |
| 5 | | | 55 | blue |
| 6 | 55 | 55 | | yellow |
| 7 | 55 | | 55 | pink |
| 8 | | 55 | 55 | sky blue |

The binary map generator 61 calculates a difference between an RGB value for each pixel included in the character candidate image and the RGB value corresponding to each seed point included in the color table, and includes each corresponding pixel in a seed point associated with the smallest calculated difference.

Upon completing the pixel assortment for all pixels, the binary map generator 61 checks the number of pixels included in each seed point to find seed points. The checked number of pixels is less than or equal to a threshold value with respect to the total number of pixels. The binary map generator 61 removes the lists corresponding to the found seed points from the color table. Further, the binary map generator 61 includes the pixels, which have been included in each removed seed point, in each seed point associated with the next smallest calculated difference between the above RGB values.

Subsequently, the binary map generator 61 calculates an average RGB value for pixels included in each seed point, and repeats the operation of including corresponding pixels in a seed point associated with the smallest difference between the calculated average RGB value and the RGB value corresponding to each seed point. The binary map generator 61 repeatedly performs the above operation until the seed point update for each pixel no longer occurs.

Upon completing the seed point update for all the pixels, the binary map generator 61 outputs a plurality of binary maps, each of which consists of a set of pixels with similar color. The binary maps are shown in FIG. 8, according to an embodiment of the present invention. FIG. 8A is a map showing an initial image including a character, FIGS. 8B and 8C are maps showing character regions respectively, FIG. 8D is a map showing an aliasing region occurring in the boundary between the character and the background, and FIGS. 8E and 8F are maps showing separated background regions.

The background region determiner 62 selects a binary map that is determined as a background region corresponding to an image including a character, from which the character is excluded. The background region determiner 62 scans binary maps, created according to colors, along predetermined scan lines to check the number of consecutive colored pixels corresponding to the predetermined scan lines.

Subsequently, if the checked number of consecutive colored pixels is greater than or equal to a threshold value, the background region determiner 62 sets the consecutive colored pixels as one pixel group. The scan lines may be formed as shown in FIG. 9A, according to an embodiment of the present invention.

The background region determiner 62 checks the number of pixel groups set along the scan lines for each of a plurality of binary maps, and determines the binary map with the largest checked number of pixel groups as a binary map including a background region.

For example, when a specific binary map is scanned along four scan lines configured as shown in FIG. 9A, the background region determiner 62 determines a plurality of pixel groups in correspondence with the scan lines, as shown in FIG. 9B, and checks the number of the determined pixel groups.

The character region extractor 63 extracts a character region using an image including a character to extend a background region in a binary map, determined as the background region, and reversing the extended background region.

In a binary map, shown in FIG. 10(a) according to an embodiment of the present invention, the character region extractor 63 scans the binary map in units of m×n blocks of a predetermined size, designated by reference numeral "101". If a binary pixel exists in the block in the process of scanning the binary map, then the character region extractor 63 extends the corresponding block to an M×N block designated by reference numeral "102". Here, m, n, M, and N are natural numbers, and M and N are larger than m and n respectively. For example, the character region extractor 63 may extend an 8×8 block to a 16×16 block while scanning the binary map in units of 8×8 blocks.

The character region extractor 63 calculates an RGB average for a pixel region of the original image including a character, which corresponds to the binary pixel region, in the extended block.

Subsequently, the character region extractor 63 calculates a difference between the calculated RGB average and the RGB value of each pixel in the m×n block, except the binary pixel. If the difference calculated for any pixel is less than or equal to a threshold value, then the character region extractor 63 converts the corresponding pixel into a binary pixel, thereby extending a background region.

Upon performing the operation for binary pixel conversion up to the last pixel, the character region extractor 63 reverses the resultant image to thereby create an image for character region extraction.

According to embodiments of the present invention, an image for character region extraction, as shown in FIG. 10D, can be created by extending the background region of a binary map as shown in FIG. 10B to the background region, as shown in FIG. 10C.

Accordingly, in embodiments of the present invention, an image from which a more definite character region is capable of being extracted can be created by selecting and reversing the background of a character in a binary map for character extraction.

FIG. 11 illustrates a detailed configuration of a character recognizer for character extraction, according to an embodiment of the present invention.

This embodiment of the present invention is described on the assumption that a character has a brightness of 0.

The character recognizer 11 includes a character candidate region detector 111, a character contour information acquirer 112, a character region information acquirer 113, and a character region determiner 114.

The character candidate region detector 111 outputs a binary image including a character candidate region from an image that includes a character. The character candidate region is presumed as a character region.

The character contour information acquirer 112 extracts the contour of a character from a character candidate region in a binary image, and sets a vertical direction angle for each pixel constituting the extracted contour.

The character contour information acquirer 112 presets a comparison mask that is used to extract a contour from a binary image. The comparison mask is shown in FIG. 12A, according to an embodiment of the present invention. In this comparison mask, symbol "X" represents a pixel not involved in the operation, and symbol "O" represents a pixel involved in the operation.

FIGS. 12A-12F are diagrams illustrating a procedure for extracting a character contour and setting character contour information for the extracted character contour by the character contour information acquirer 112, according to an embodiment of the present invention.

The character contour information acquirer 112 extracts the contour of a character region by comparing all pixels existing in a binary image with a comparison mask.

Specifically, the character contour information acquirer 112 matches a specific pixel in a binary image, which is to be compared with a comparison mask, to a reference pixel that is located in the center of the comparison mask, as designated by reference numeral "121" in FIG. 9A, and determines if the specific pixel has a brightness of 0. If the specific pixel has a brightness of 0, the character contour information acquirer 112 determines if neighboring pixels located above, below, and on both sides of the specific pixel have a brightness of 0.

For example, in a specific pixel region of a binary image as shown in FIG. 12B, each pixel is compared with a comparison mask as shown in FIG. 12C. When the pixel corresponding to reference numeral "122" has a brightness of 0, and all pixels located above, below, and on both sides of the pixel of reference numeral "122" have a brightness of 0, a contour, as shown in FIG. 12D, can be extracted.

If, as a result of the comparison, neighboring pixels around a specific pixel have a brightness of 0, then the character contour information acquirer 112 changes the brightness of the specific pixel corresponding to the reference pixel from 0 to 255.

Upon performing the above operation up to the last pixel in the binary image, the character contour information acquirer 112 creates a binary image including a character contour. Subsequently, the character contour information acquirer 112 detects a vertical direction angle for each pixel constituting the character contour, and quantizes the detected angles by a predetermined representative value.

The character contour information acquirer 112 sets a specific pixel on a character contour as a reference pixel, and sets a block region of a predetermined size, in the center of which the set reference pixel is located. Subsequently, the character contour information acquirer 112 calculates direction vectors between the reference pixel and pixels with a brightness of 0 in the block region, as shown in FIG. 12E, and sets a vector value corresponding to a sum of the calculated direction vectors as the vertical direction angle of the reference pixel.

As shown in FIG. 12F, the character contour information acquirer 112 presets n representative angles by dividing 360 degrees into n equal parts. The character contour information acquirer 112 determines which representative angle of the preset representative angels is a representative angle in the threshold range of which the vertical direction angle set in the above operation is included. Here, n is a natural number.

Subsequently, the character contour information acquirer 112 quantizes the vertical direction angle by the representative angle corresponding to the threshold range in which the vertical direction angle is included. The character contour information acquirer 112 calculates direction vectors to set vertical direction angles for all pixels on the character contour and quantizes the vertical direction angles by the preset representative angles.

The character region information acquirer 113 sets a character stroke width and a character stroke angle in each pixel constituting a character contour by using character contour information acquired from the character contour information acquirer 112. The character stroke width is a distance from a specific pixel to a pixel on the character contour, which is opposite the specific pixel in the direction of the representative angle of the specific pixel.

The character region information acquirer 113 calculates a first character stroke width that is a distance from a specific pixel of pixels constituting a character contour to a pixel on the character contour, which is opposite the specific pixel in the direction of the representative angle corresponding to the specific pixel. The character region information acquirer also calculates second and third character stroke widths that are distances from the specific pixel to pixels on the character contour, which are opposite the specific pixel in the direction of the representative angles on both sides of the representative angle corresponding to the specific pixel.

The character region information acquirer 113 sets the shortest character stroke width of the three calculated character stroke widths as the character stroke width of the corresponding pixel, and sets the representative angle corresponding to the set character stroke width as the angle of the corresponding pixel.

Subsequently, the character region information acquirer 113 sets character stroke widths and angles for all pixels constituting the character contour through the operation described above.

FIGS. 13A-13G illustrate a procedure of setting a character stroke width and a character stroke angle in each pixel constituting a character contour by a character region information acquirer, according to an embodiment of the present invention.

Figures 13A, 13B, 13C, 13D, 13E, 13F, 13G:
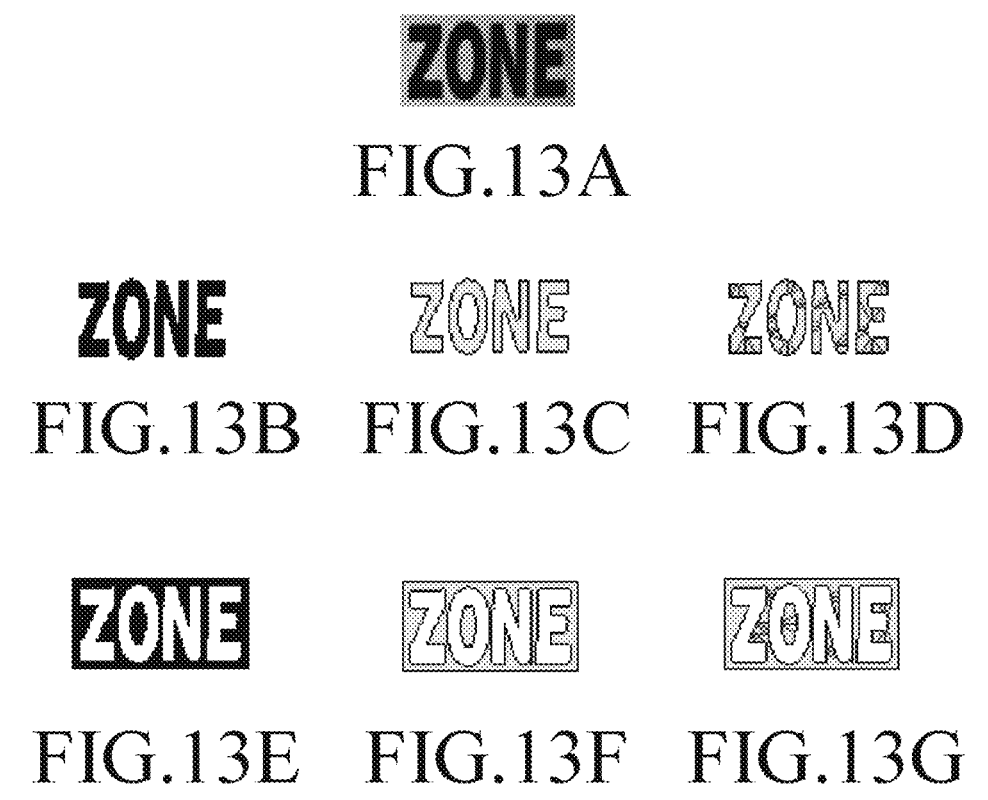

FIG. 13A shows a character candidate region in an image that includes a character. Binarization is required to definitely identify a region for character stroke width calculation. The binarization may be applied for brightness or RGB color spaces. FIGS. 13B and 13E show two reversed binary images resulting from such binarization. Character stroke width calculation is performed for both the images because the character may be brighter than the background, or may be darker than the background.

FIGS. 13C and 13F show images including contours (represented by black pixels) extracted from the binary images of FIGS. 13B and 13E, respectively. FIGS. 13D and 13G show a process of calculating a character stroke width from the contour into the corresponding stroke in the above-mentioned three directions (i.e., first to third character stroke widths). In FIGS. 13D and 13G, one of the lines in each set of three lines designates a character stroke width that is selected in the direction of the shortest distance, and the remaining lines designate character stroke widths that are calculated in the remaining two candidate directions.

Conventionally, it may have been difficult to measure an accurate stroke width because a vertical stroke width calculated in some characters, such as "ㅇ", "ㅅ", and "ㅈ", may not be selected as the shortest distance. However, in embodiments of the present invention, the shortest stroke width can be measured for the characters, such as "ㅇ", "ㅅ", and "ㅈ", by using the above-described three directions.

When a stroke width is measured in the above manner, a long stroke width may be measured horizontally or vertically in some characters, such as "ㅣ" and "ㅡ". The character region information acquirer 113 compares the long stroke width with the size of a character candidate region, and excludes the long stroke width from possible stroke widths when the long stroke width is larger than the size of the character candidate region.

Referring again to FIG. 11, the character region determiner 114 determines if a character actually exists in a character candidate region. Specifically, the character region determiner 114 determines the existence or non-existence of a character by determining the ratio of an effective character stroke width to the overall length of a character contour.

Figure 14A:
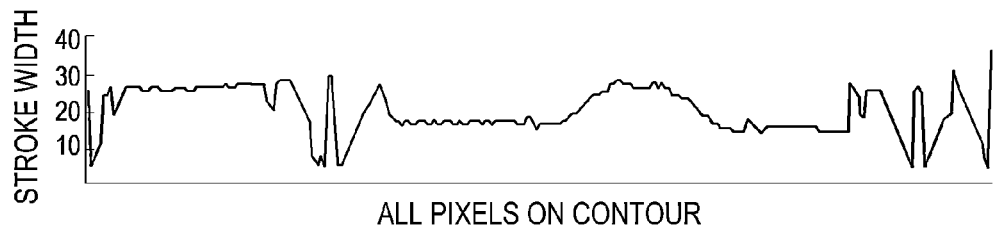
FIG. 14 is a diagram illustrating how to determine a character region in a character candidate image region, in accordance with an embodiment of the present invention.
Figure 14B:
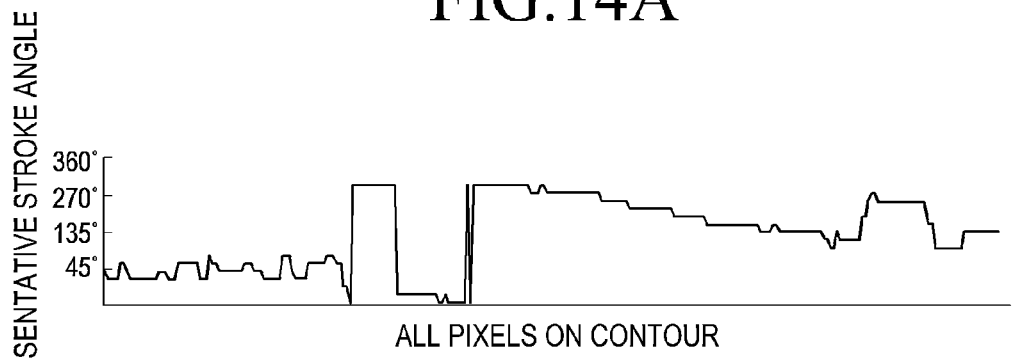
Figure 14C:
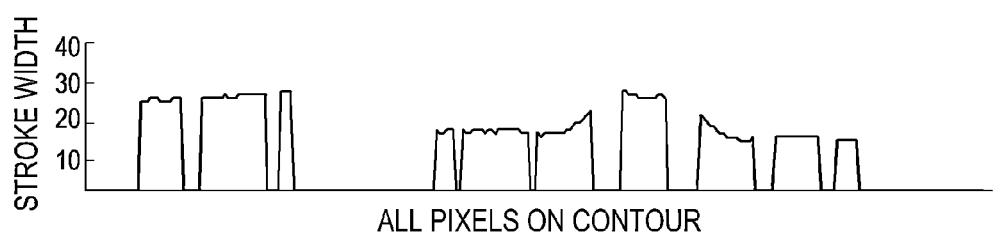

FIGS. 14A-14C illustrate how to determine a character region in a character candidate image region, according to an embodiment of the present invention.

A stroke width includes stroke width intervals where a stroke width value is maintained constant and stroke width intervals where a stroke width value severely fluctuates, as shown in FIG. 14A. When a character exists, the intervals where a stroke width value is maintained constant have a higher ratio in the overall contour. However, even in the case of an object other than a character, there are intervals where a stroke width value is maintained constant.

Assuming that a character is a combination of strokes with a constant width, a stroke may be defined as one line with a certain direction. Specifically, in a character including strokes, stroke angle intervals where the angle of a contour is maintained constant frequently appear, as shown in FIG. 14B. Thus, in the embodiments of the present invention, whether a character exists is not only determined by an effective stroke width. As shown in FIG. 14C, only effective strokes are left using angle information as shown in FIG. 14B, along with the effective stroke width, and then whether a character exists is determined using the left effective strokes.

The character region determiner 114 detects a stroke angle interval where a constant angle appears, as shown in FIG. 14B, in the overall contour. Subsequently, in the detected interval, the character region determiner 114 leaves only stroke width intervals where a stroke width is constant in a tolerance of ±1 pixel and a difference between a maximum stroke width and a minimum stroke width is less than or equal to half of the interval length. The character region determiner 114 redefines the remaining stroke width intervals as 0. A result of this redefinition is shown in FIG. 14C.

Subsequently, the character region determiner 114 determines the region including only the effective stroke width intervals to be an effective character region when the ratio of the total length of the effective stroke width intervals to the overall length of the contour is greater than or equal to a predetermined ratio.

The embodiments of the present invention can accurately calculate a character stroke width by using a character contour and quantized representative angles to set the character stroke width and angle of each pixel constituting the character contour. Accordingly, it is possible to effectively determine if a character is actually included in a character candidate region.

Figure 15:
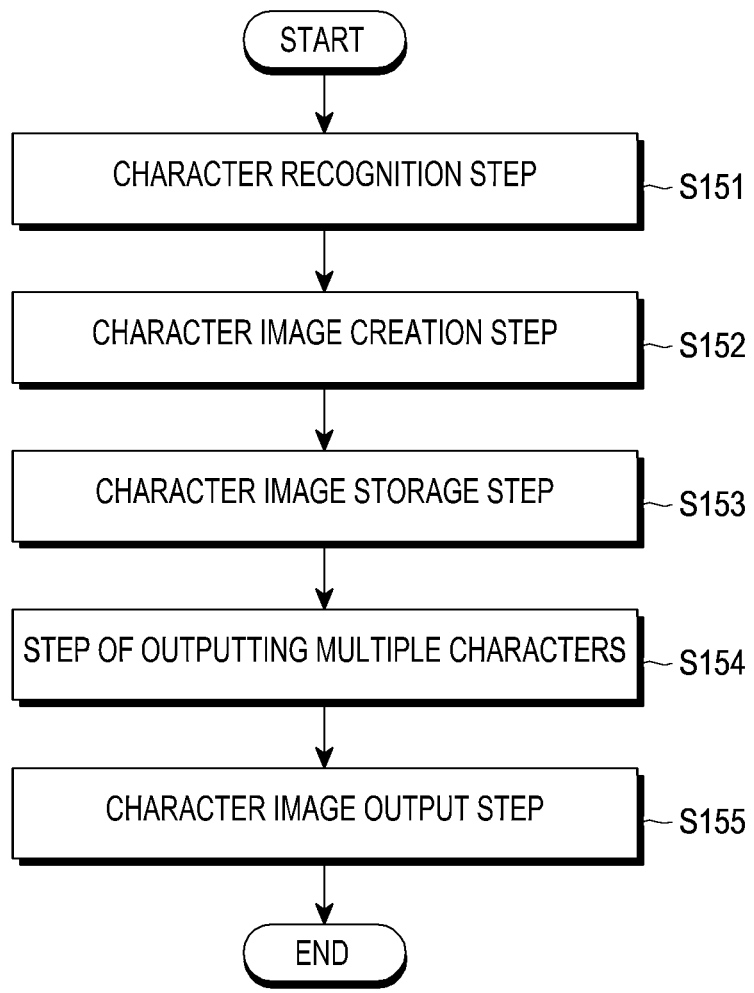
FIG. 15 is a flowchart illustrating a method for generating a character collage message, in accordance with an embodiment of the present invention.

FIG. 15 is a flowchart illustrating a method for generating a character collage message, according to an embodiment of the present invention.

In step S151, a character is recognized from an image that includes the corresponding character. Specifically, only a region in which a character exists is automatically detected from an image including the character, and information about the character is extracted in the detected region to recognize the meaning of the corresponding character. The image including a character may be any one of an image stored in the memory 13, an image received from an external device, an image photographed using an internal imaging device, and the like. As used herein, the term "character" includes all characters for expressing different languages, and all symbols and signs.

In step S152, a region that includes the recognized character is extracted from the image and the extracted region is scaled up/down to a predetermined size to create a character image. The extracted region completely includes at least the outline of the corresponding character, and preferably leaves a margin around the outline of the corresponding character so as to ensure the legibility of the corresponding character.

In step S153, the created character image corresponding to the character is stored in the memory 13.

If the character recognizer 11 fails to automatically recognize the corresponding character and thus cannot determine the meaning of the character, a user is allowed to manually recognize the corresponding character, match the recognized character to the corresponding character image, and then store the character image in the memory 13. There may be several character images corresponding to the recognized character, as described with reference to FIG. 4.

In step S154, a plurality of characters input by a user are output to the output unit 15.

In step S155, at least some of the plurality of characters input according to the above character input step are replaced by the character images stored in the memory 13, and the character images are output as a substitute for the at least some characters to the output unit 15. According to an embodiment of the present invention, when a plurality of character images correspond to one character, the controller 16 controls the method in such a manner as to allow a user to select any one of the plurality of character images, which is in turn preferentially output as a substitute for the corresponding character when the corresponding character is input.

Figure 16:
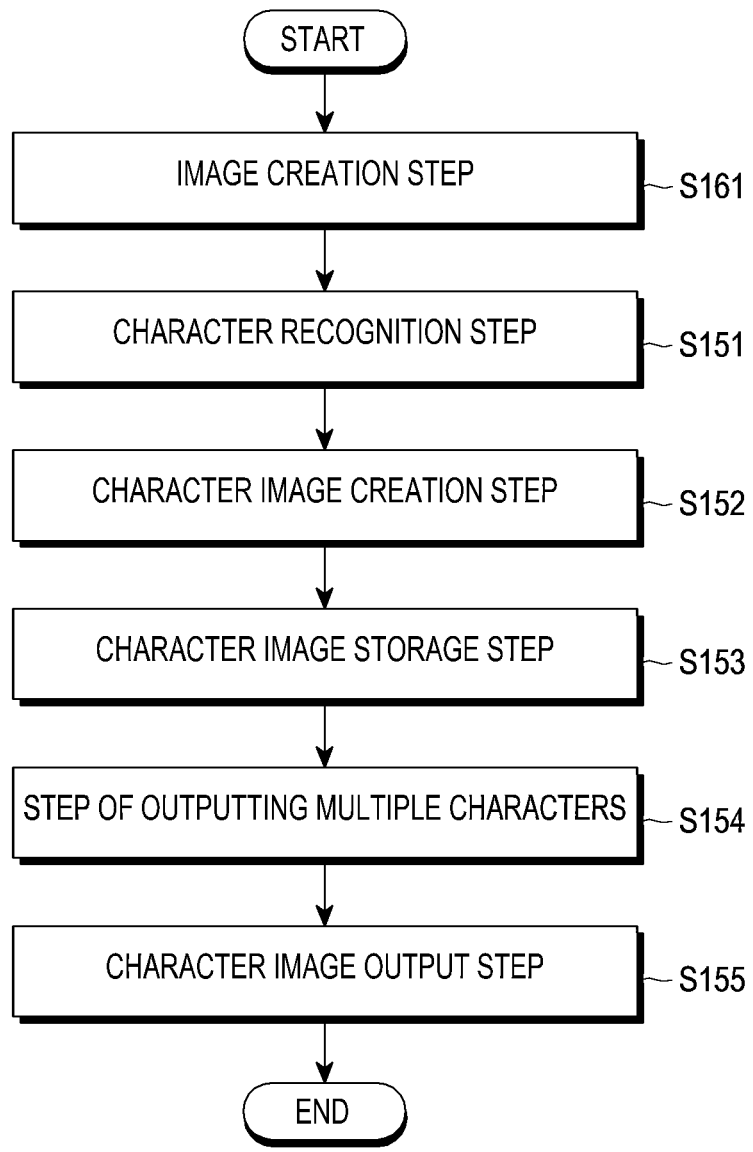
FIG. 16 is a flowchart illustrating a method for generating a character collage message, in accordance with another embodiment of the present invention.

FIG. 16 is a flowchart illustrating a method for generating a character collage message, according to another embodiment of the present invention.

As shown in FIG. 16, the method for generating a character collage message according to this embodiment further includes step S161 in addition to the steps of the character collage message generation method of FIG. 15. In step S161, an image including a character is created. The image including a character may be created by using the internal imaging unit 17 of the apparatus to directly photograph an external subject. The image including a character may also be created by receiving the image from an external device wirelessly or by cable.

Figure 17:
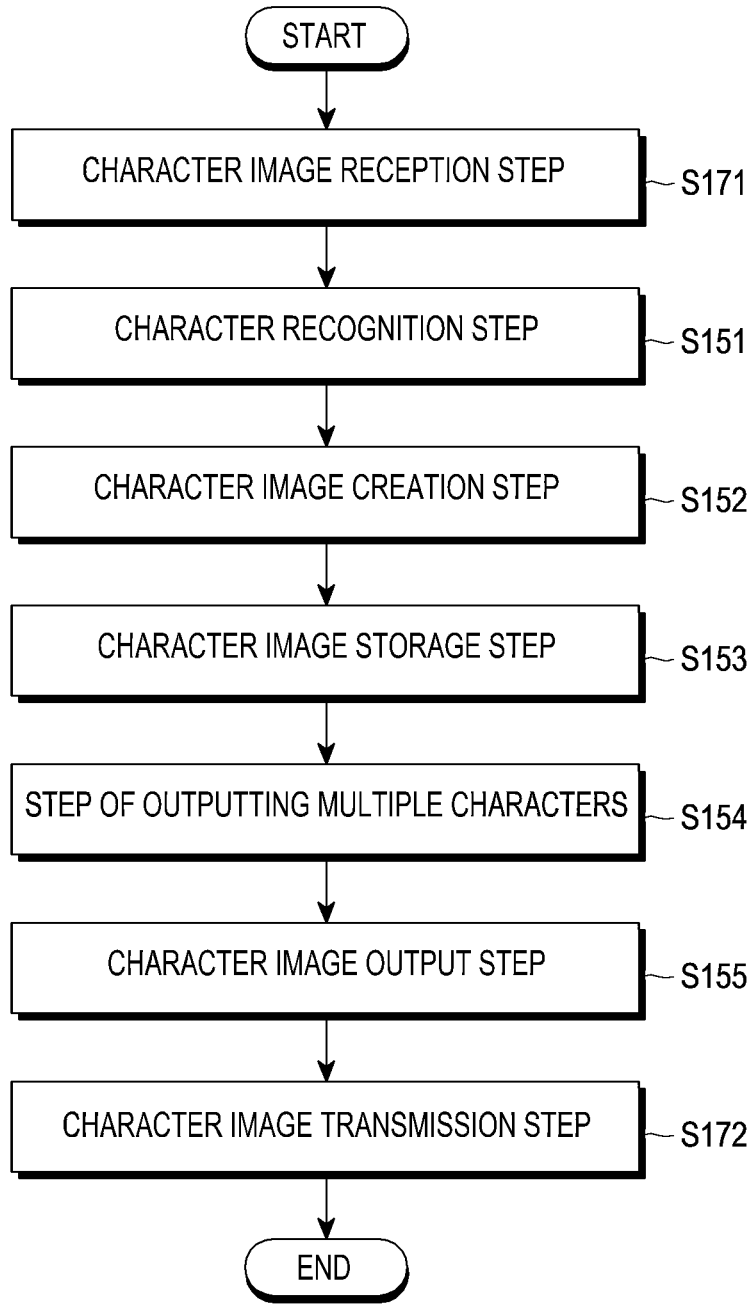
FIG. 17 is a flowchart illustrating a method for generating a character collage message, in accordance with yet another embodiment of the present invention.

FIG. 17 is a flowchart illustrating a method for generating a character collage message, according to yet another embodiment of the present invention.

As shown in FIG. 17, the method for generating a character collage message according to this embodiment further includes step S171 and step S172 in addition to the steps of the character collage message generation method of FIG. 15.

In step S171, a character image is received from an external device wirelessly or by cable. The character image may be received directly or extracted from a received character collage message including the character image.

In step S172, a character collage message including the character image may be transmitted to an external device by using wireless or wired communication. Further, the character image may also be transmitted directly to an external device by using wireless or wired communication. Upon receiving the character image or the character collage message including the character image, the external device can generate and transmit a character collage message in the same manner by matching the character image to the pertinent character.

Further, according to an embodiment of the present invention, a plurality of character images included in a plurality of character collage messages are matched to the pertinent characters. In this process, a plurality of character images may correspond to one character. In order to prevent confusion between the plurality of character images when the character input from a user is replaced by one character image, any one of the plurality of character images is set as a default character image. When the corresponding character is subsequently input, the default character image is preferentially output. The correspondence and output of a plurality of character images is described above with respect to FIG. 4.

In transmitting and receiving a character collage message including a character image, according to an embodiment of the present invention, a character collage message created into one image file including output character images may be wirelessly transmitted and received. When this scheme is employed, the existing MMS can be utilized. Further, according to another embodiment of the present invention, instead of using the existing MMS, a character collage message including a combination of a character image and a text may be transmitted and received directly using an application only for a character collage message.

Figure 18:
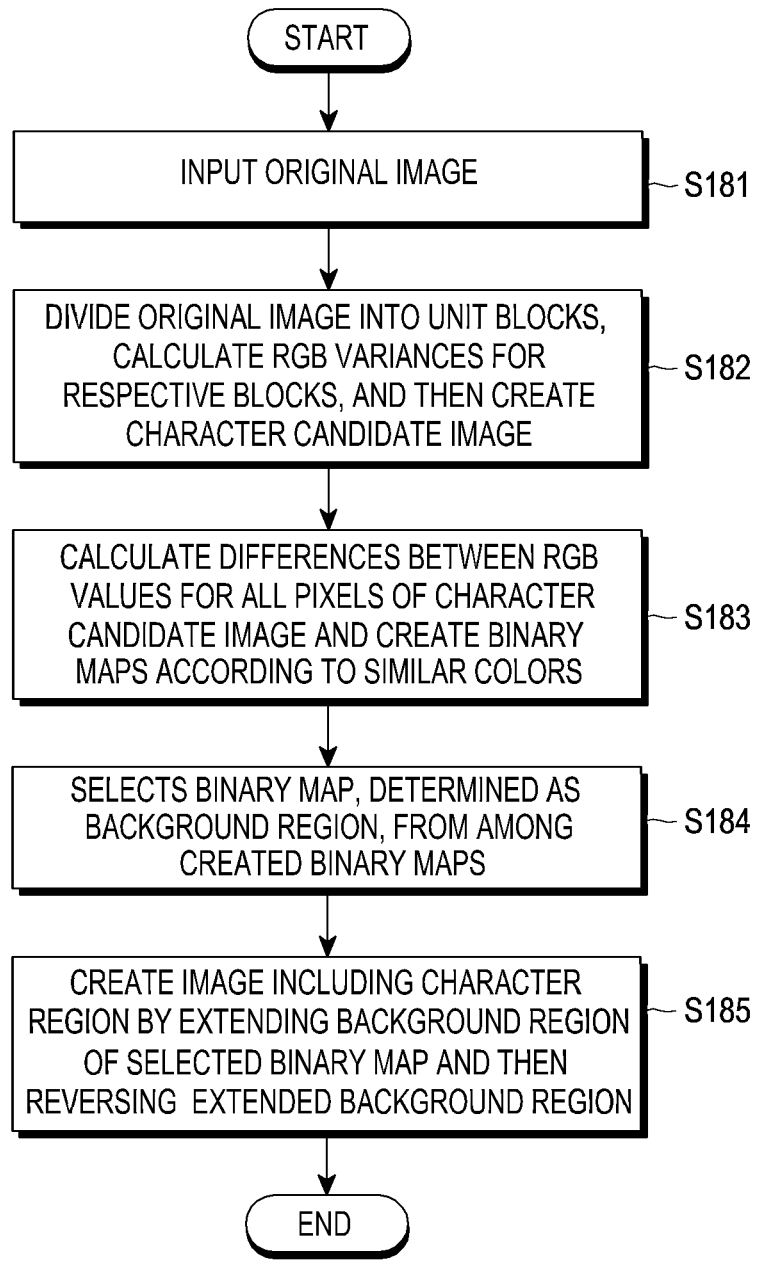
FIG. 18 is a flowchart illustrating character region extraction in a character recognition step, in accordance with an embodiment of the present invention.

FIG. 18 is a flowchart illustrating a method for character region extraction in a character recognition step, according to an embodiment of the present invention.

When an image including a character is input in step S181, the binary map generator 61 divides the image into unit blocks, calculates an RGB variance for each unit block, and then creates a character candidate image in step S182. The character candidate image is an image in which a character candidate region including the character is included and from which a region presumed as the background is excluded.

In step S183, the binary map generator 61 creates binary maps according to regions with similar color by calculating a difference between color values for all pixels of the character candidate image. Step S183 is described in detail below with reference to FIG. 19.

Figure 19:
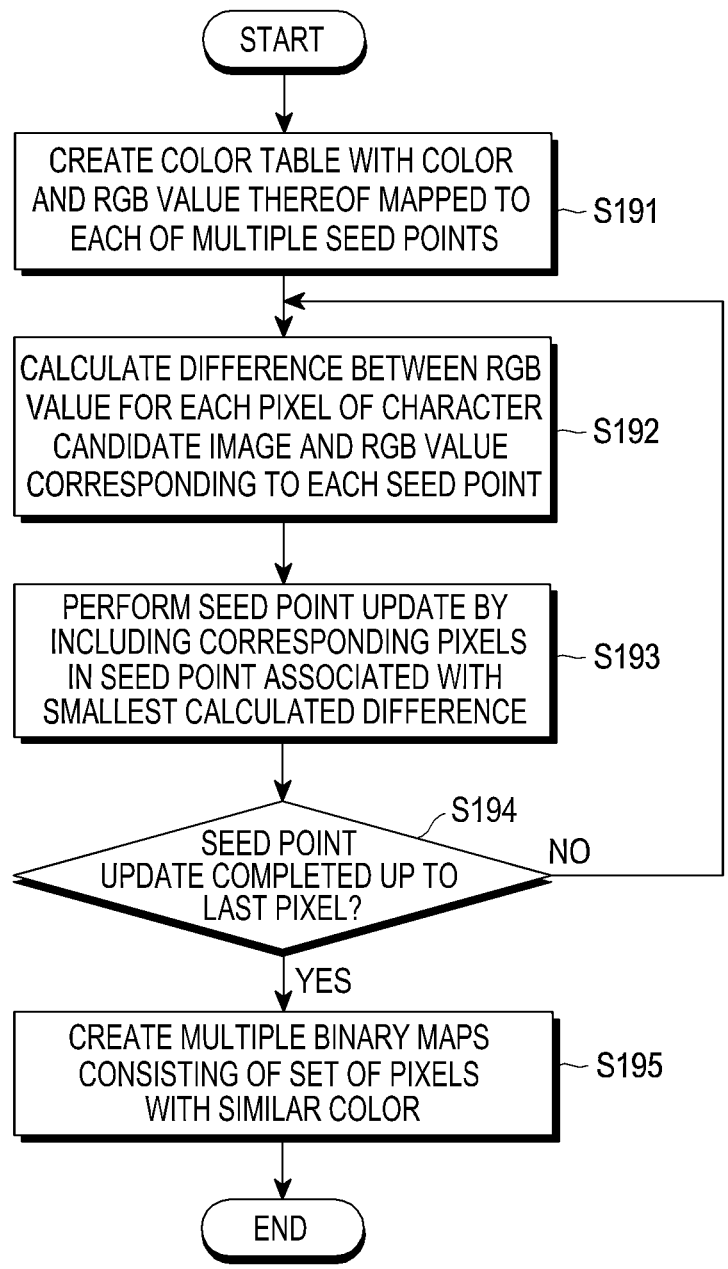
FIG. 19 is a flowchart illustrating a procedure of creating binary maps according to colors by a binary map generator, in accordance with an embodiment of the present invention.

FIG. 19 is a flowchart illustrating a procedure for creating binary maps according to colors by the binary map generator 61, according to an embodiment of the present invention. In step S191, the binary map generator 61 creates a color table by mapping a corresponding color and its RGB value to each of a plurality of seed points. The color table may be created as presented above in Table 1.

In step S192, the binary map generator 61 calculates a difference between an RGB value for each pixel included in the character candidate image and the RGB value corresponding to each seed point included in the color table.

In step S193, the binary map generator 61 performs a seed point update for each pixel by including each corresponding pixel in a seed point associated with the smallest calculated difference.

In step S194, the binary map generator 61 determines if the seed point update is completed up to the last pixel. If the seed point update is completed, then the binary map generator 61 proceeds to step S195. If the seed point update is not completed, then the binary map generator 61 returns to step S192, and calculates a difference between RGB values and continuously performs steps S193 and S194 until the seed point update is completed up to the last pixel.

Upon proceeding from step S194 to step S195, the binary map generator 61 creates a plurality of binary maps, each of which consists of a set of pixels with similar color. For example, the binary map generator 61 may create binary maps corresponding to the eight colors of Table 1.

Referring again to FIG. 18, the background region determiner 62 selects a binary map, which is determined as a background region, from among the plurality of created binary maps, in step S184. Step S184 is described in detail below with reference to FIG. 20.

Figure 20:
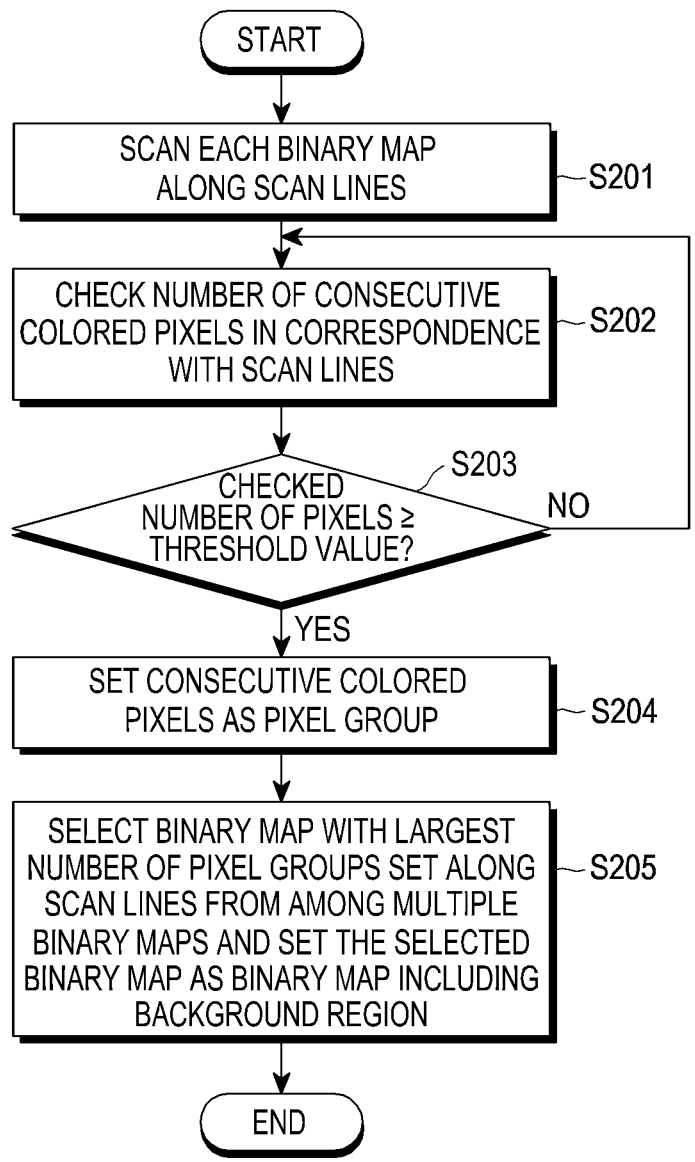
FIG. 20 is a flowchart illustrating a procedure of selecting a binary map, determined to be a background region, by a background region determiner, in accordance with an embodiment of the present invention.

FIG. 20 is a flowchart illustrating a procedure of selecting a binary map, determined to be a background region, by the background region determiner 62, according to an embodiment of the present invention.

In step S201, the background region determiner 62 scans each binary map along predetermined scan lines. The background region determiner 62 may scan each binary map using the scan lines of FIG. 9A described above.

In step S202, the background region determiner 62 checks the number of consecutive colored pixels in correspondence with the predetermined scan lines. For example, when consecutive pixels exist along the scan lines, the background region determiner 62 counts the number of the consecutive pixels along the scan lines.

In step S203, the background region determiner 62 determines if the checked number of consecutive colored pixels is greater than or equal to a threshold value. The background region determiner 62 proceeds to step S204 when the checked number of consecutive colored pixels is greater than or equal to a threshold value, and returns to step S202 and continuously checks the number of consecutive colored pixels when the checked number of consecutive colored pixels is less than the threshold value.

In step S204, the background region determiner 62 sets the consecutive colored pixels as one pixel group.

In step S205, the background region determiner 62 checks the number of pixel groups set along the scan lines for each of a plurality of binary maps, and selects the binary map with the largest checked number of pixel groups as a binary map including a background region.

Returning again to FIG. 18, the character region extractor 63 creates an image including a character region by extending the background region in the selected binary map and reversing the extended background region, in step S185. Step S185 is described in detail below with referenced to FIG. 21.

Figure 21:
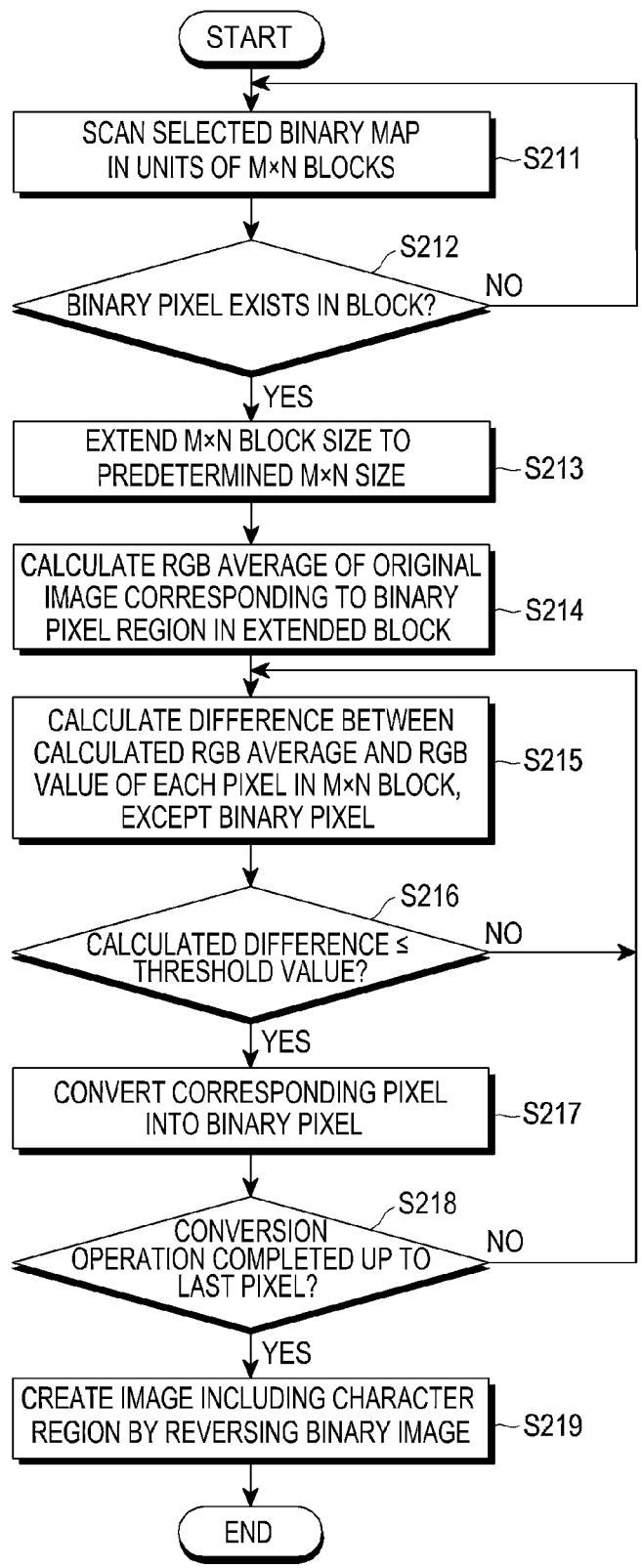
FIG. 21 is a flowchart illustrating a procedure of creating an image including a character region by a character region extractor, in accordance with an embodiment of the present invention.

FIG. 21 is a flowchart illustrating a procedure of creating an image including a character region by the character region extractor 63, according to an embodiment of the present invention.

In step S211, the character region extractor 63 scans the selected binary map in units of m×n blocks of a predetermined size. Here, m and n are natural numbers.

In step S212, the character region extractor 63 determines if a binary pixel exists in the m×n block. The character region extractor 63 proceeds to step S213 when a binary pixel exists, and returns to step S211 and continuously performs scanning in units of m×n blocks when a binary pixel does not exist.

In step S213, the character region extractor 63 extends the m×n block including the binary pixel to an M×N block of a predetermined size. Here, M and N are natural numbers, and M and N are larger than m and n, respectively.

In step S214, the character region extractor 63 calculates the RGB average of the original image including a character, which corresponds to the binary pixel region, in the extended block. The character region extractor 63 may calculate the R average, G average, and B average of the image including a character, or may calculate the overall RGB average.

In step S215, the character region extractor 63 calculates a difference between the calculated RGB average and the RGB value of each pixel in the m×n block, except the binary pixel.

In step S216, the character region extractor 63 determines if the difference calculated for any pixel is less than or equal to a threshold value. The character region extractor 63 proceeds to step S217 when the calculated difference is less than or equal to the threshold value, and returns to step S215 and continuously calculates a difference between the calculated RGB average and the RGB value of the next pixel when the calculated difference is greater than the threshold value.

In step S217, the character region extractor 63 converts the corresponding pixel into a binary pixel.

In step S218, the character region extractor 63 determines if the operation for binary pixel conversion is completed up to the last pixel. The character region extractor 63 proceeds to step S219 when the operation is completed, and returns to step S215, continuously calculates a difference between the calculated RGB average and the RGB value of the next pixel, and then performs steps S216 to S218 when the operation is not completed.

In step S219, the character region extractor 63 reverses the resultant image to thereby create an image including a character region, and then ends the image creation operation.

Figure 22:
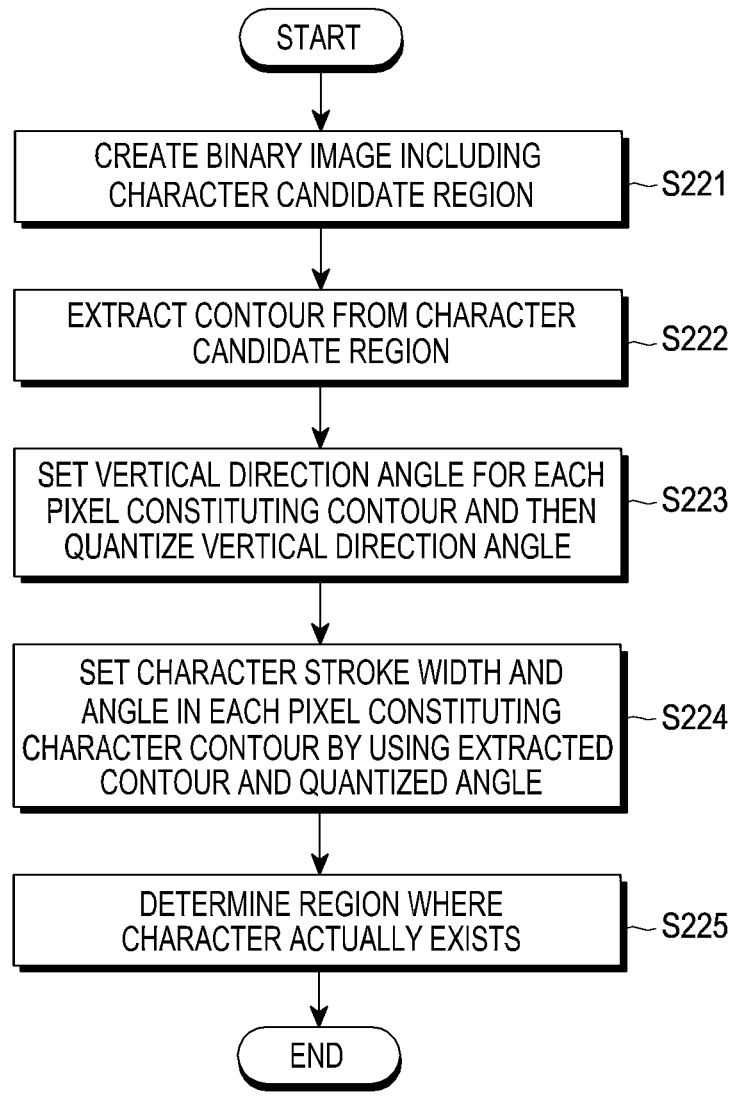
FIG. 22 is a flowchart illustrating sub-steps for character region extraction using character stroke width calculation in a character recognition step, in accordance with an embodiment of the present invention.

FIG. 22 is a flowchart illustrating character region extraction using character stroke width calculation in a character recognition step, according to an embodiment of the present invention.

In step S221, the character candidate region detector 111 creates a binary image including a character candidate region, and outputs the created binary image to the character contour information acquirer 112.

In step S222, the character contour information acquirer 112 extracts a character contour from the character candidate region in the binary image. Step S222 is described in detail below with reference to FIG. 23.

Figure 23:
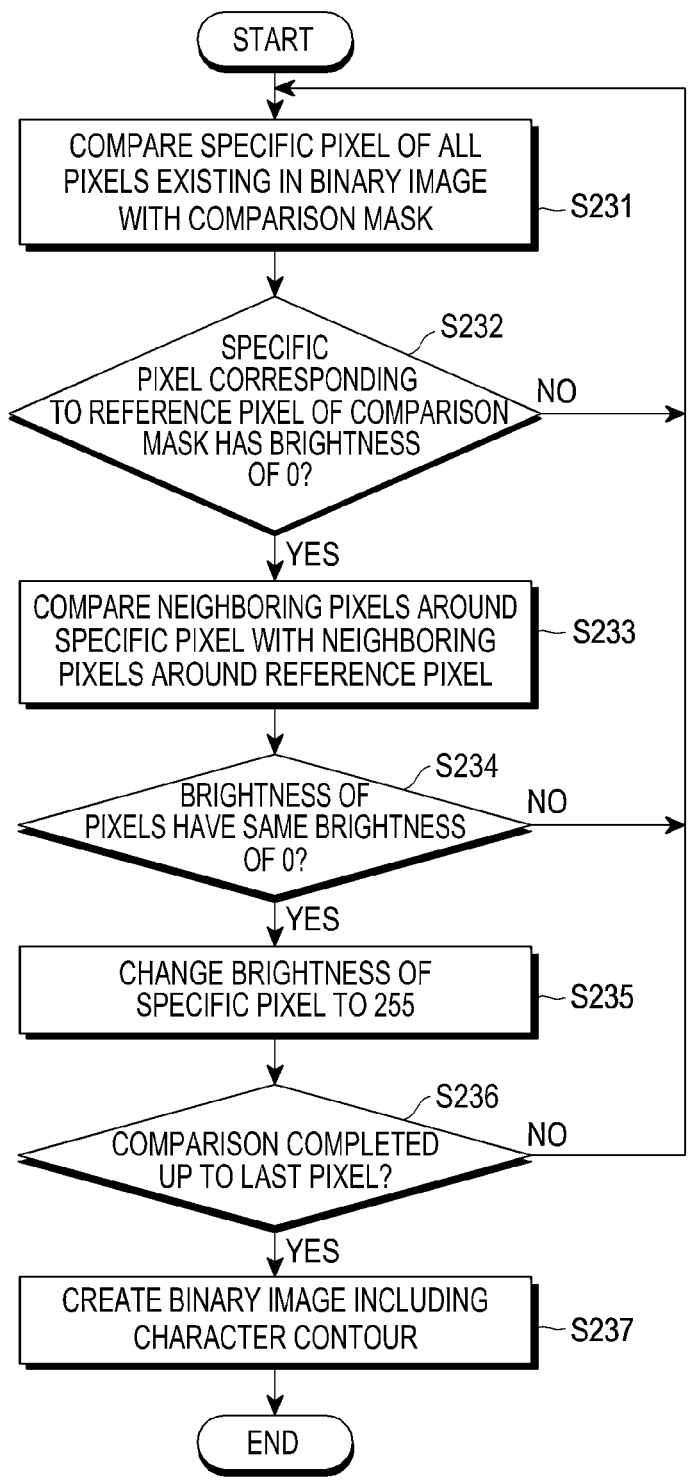
FIG. 23 is a flowchart illustrating a procedure of extracting a character contour by a character contour information acquirer, in accordance with an embodiment of the present invention.

FIG. 23 is a flowchart illustrating a procedure of extracting a character contour by the character contour information acquirer 112, according to an embodiment of the present invention.

In step S231, the character contour information acquirer 112 compares a specific pixel of all pixels existing in the binary image with a comparison mask. The comparison mask is a mask as shown in FIGS. 12A) and 12C.

In step S232, the character contour information acquirer 112 matches the specific pixel to a reference pixel of the comparison mask, and determines if the specific pixel has a brightness of 0. The character contour information acquirer 112 proceeds to step S233 when the specific pixel has a brightness of 0, and returns to step S231 and continuously compares another specific pixel with the comparison mask when the specific pixel does not have a brightness of 0.

In step S233, the character contour information acquirer 112 compares neighboring pixels around the specific pixel with neighboring pixels around the reference pixel. Specifically, the character contour information acquirer 112 determines if neighboring pixels located above, below, and on both sides of the reference pixel have a brightness of 0, and neighboring pixels located above, below, and on both sides of the specific pixel also have a brightness of 0.

The character contour information acquirer 112 proceeds to step S235 when the neighboring pixels have a brightness of 0, and returns to step S231 and continuously compares another specific pixel with the comparison mask when the neighboring pixels do not have a brightness of 0.

In step S235, the character contour information acquirer 112 changes the brightness of the specific pixel from 0 to 255. Although, by way of example, the brightness of the specific pixel is changed to 255 in this embodiment of the present invention, it may be changed to any brightness.

In step S236, the character contour information acquirer 112 determines if the comparison operation is completed up to the last pixel. The character contour information acquirer 112 proceeds to step S237 when the comparison operation is completed, and returns to step S231 and continuously compares another specific pixel with the comparison mask when the comparison operation is not completed.

In step S237, the character contour information acquirer 112 creates a binary image including a character contour.

Referring back to FIG. 22, the character contour information acquirer 112 sets a vertical direction angle for each pixel constituting the extracted contour, and then quantizes the set vertical direction angle, in step S223. Step S223 is described in detail below with reference to FIG. 24.

Figure 24:
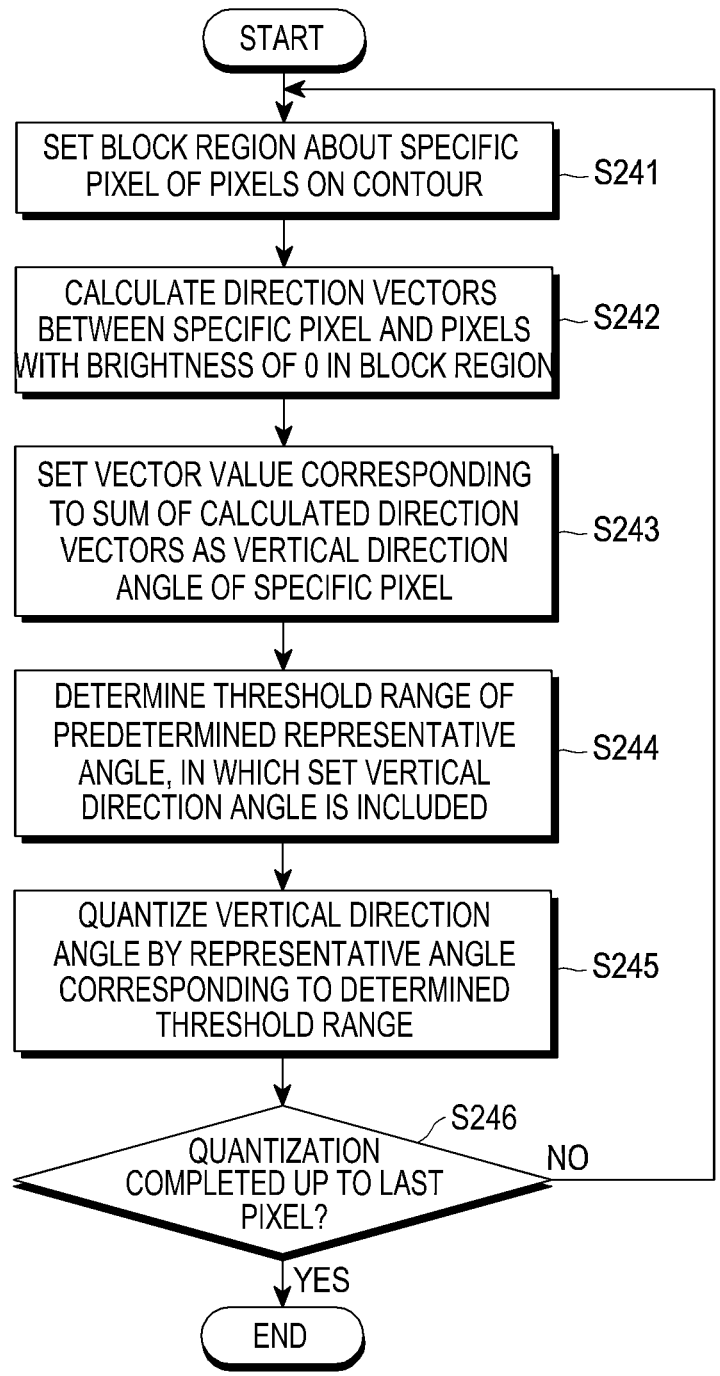
FIG. 24 is a flowchart illustrating a procedure of quantizing vertical direction angles for pixels on a character contour in a character contour information acquirer, in accordance with an embodiment of the present invention.

FIG. 24 is a flowchart illustrating a procedure of quantizing vertical angles for pixels on a character contour in the character contour information acquirer 112, according to an embodiment of the present invention.

In step S241, the character contour information acquirer 112 takes a specific pixel from among pixels on the character contour, and sets a block region of a predetermined size, in the center of which the specific pixel is located.

In step S242, the character contour information acquirer 112 calculates direction vectors between the specific pixel and pixels with a brightness of 0 in the block region. Although, by way of example, a brightness of 0 is assumed in this embodiment of the present invention, a brightness set by a user or a predetermined brightness may also be utilized.

In step S243, the character contour information acquirer 112 sets a vector value corresponding to a sum of the calculated direction vectors as the vertical direction angle of the specific pixel. As described above, the vertical direction angle of a pixel corresponding to reference numeral "123" of FIG. 12E can be calculated by calculating direction vectors between the pixel 123 and other pixels with a brightness of 0 and summating the calculated direction vectors.

In step S244, the character contour information acquirer 112 determines which representative angle of preset representative angels is a representative angle, in the threshold range of which the set vertical direction angle is included.

In step S245, the character contour information acquirer 112 quantizes the vertical direction angle by the determined representative angle corresponding to the threshold range in which the vertical direction angle is included. For example, it is assumed that the calculated vertical direction angle is 47.5°, and a representative angle of 45° has a threshold range of 28° to 53°. Character contour information acquirer 112 identifies that the calculated vertical angle is included in the threshold range of 28° to 53°, and thus quantizes the vertical direction angle by the representative angle of 45°.

In step S246, the character contour information acquirer 112 determines if the vertical direction angle quantization is completed up to the last pixel. The character contour information acquirer 112 ends the quantization operation when the vertical direction angle quantization is completed, and returns to step S241 and performs steps S242 to S246 when the vertical direction angle quantization is not completed.

Referring again to FIG. 22, the character region information acquirer 113 sets a character stroke width and a character stroke angle in each pixel constituting the character contour by using the extracted character contour and the quantized angles, in step S224. Step S224 is described in detail below with reference to FIG. 25.

Figure 25:
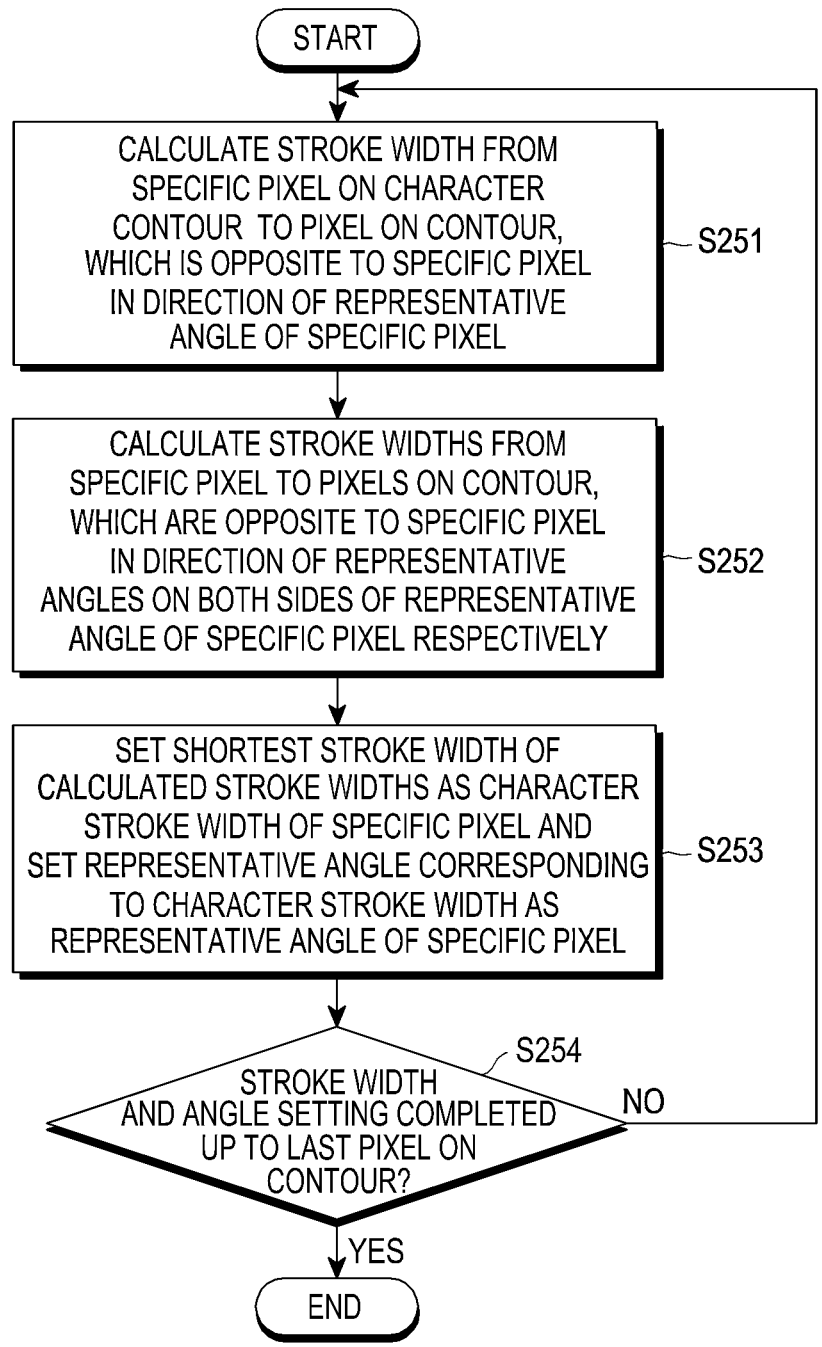
FIG. 25 is a flowchart illustrating a procedure of setting a character stroke width and a character stroke angle in each pixel constituting a character contour by a character region information acquirer, in accordance with an embodiment of the present invention.

FIG. 25 is a flowchart illustrating a procedure of setting a character stroke width and a character stroke angle in each pixel constituting a character contour by the character region information acquirer 113, according to an embodiment of the present invention.

In step S251, the character region information acquirer 113 calculates a character stroke width corresponding to a distance from a specific pixel to a pixel on the character contour, which is opposite to the specific pixel in the direction of the representative angle of the specific pixel. The character stroke width corresponds to a distance from the specific pixel for which the character stroke width is acquired and the nearest pixel of pixels on the character contour, which are located in the direction of the representative angle of the specific pixel.

In step S252, the character region information acquirer 113 calculates character stroke widths that are distances from the specific pixel to pixels on the character contour, which are opposite the specific pixel in the direction of the representative angles on both sides of the representative angle of the specific pixel.

In step S253, the character region information acquirer 113 sets the shortest character stroke width of the three calculated character stroke widths as the character stroke width of the corresponding specific pixel, and sets the representative angle corresponding to the set character stroke width as the angle of the corresponding specific pixel.

In step S254, the character region information acquirer 113 determines if the stroke width and representative angle setting is completed up to the last pixel on the character contour. The character region information acquirer 113 ends the setting operation when the stroke width and representative angle setting is completed, and returns to step S251 and performs steps S251 to S254 for the next pixel on the character contour when the stroke width and representative angle setting is not completed.

Referring back again to FIG. 22, the character region determiner 114 determines a region, in which the character actually exists, in the character candidate region, in step S225.

The character region determiner 114 determines the existence or non-existence of the character by determining not only the ratio of an effective character stroke width, but also the ratio of effective angle information to the overall length of the character contour.

As described above, the apparatus and method for generating a character collage message can generate a character collage message by automatically recognizing a character from a photographed image or an internally stored image that includes characters. A corresponding character region is extracted to create a character image corresponding to the recognized character and a pertinent character is automatically converted into the character image corresponding to the character when a user inputs the character. The generated character collage message is wirelessly transmitted to a counterpart portable terminal, thereby providing an advantage in that it is possible to transmit a character collage message that is personalized, is convenient, and includes more visual information than a text message. Further, there is another advantage in that when a portable terminal receives a character collage message, it can store character images constituting the character collage message and automatically match them to pertinent characters, thereby reusing the stored character images corresponding to the characters to generate another character collage message.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An apparatus for generating a character collage message, the apparatus comprising:
    a character recognizer for recognizing a character from an image;
    a character image generator for obtaining a character image, wherein the character image includes the recognized character;
    a memory for storing the character image;
    an input unit for receiving one or more characters; and
    a controller for controlling output, to an output unit, of the character collage message generated by substituting at least one of the received one or more characters by the character image,
    wherein content of the character image is the same as the at least one of the received one or more characters.

2. The apparatus as claimed in claim 1, further comprising an imaging unit for creating the image by photographing a subject.

3. The apparatus as claimed in claim 1, further comprising a communication unit for wirelessly transmitting and receiving character collage messages.

4. The apparatus as claimed in claim 3, wherein the communication unit wirelessly transmits the character collage message that is created as a single image.

5. The apparatus as claimed in claim 1, wherein the character recognizer further comprises:
    a binary map generator for creating a plurality of binary maps according to similar colors from the character candidate image;
    a background region determiner for selecting one of the plurality of binary maps that comprises a background region; and
    a character region extractor for extending and reversing the background region of the selected binary map and creating an image including a character region.

6. The apparatus as claimed in claim 5, wherein the binary map generator divides the image into unit blocks of a predetermined size, calculates a RGB variance for the each unit block, and when at least one of the calculated RGB variances is greater than or equal to a predetermined variance threshold value, creates the character candidate image from which at least one unit block having the at least one RGB variance is excluded.

7. The apparatus as claimed in claim 6, wherein the binary map generator creates a color table in which a corresponding color and an RGB value thereof are mapped to each of a plurality of seed points.

8. The apparatus as claimed in claim 7, wherein the binary map generator calculates a difference between an RGB value for each pixel included in the character candidate image and the RGB value corresponding to each of the plurality of seed points, and performs a seed point update for each pixel by including each corresponding pixel in a seed point associated with the smallest calculated difference.

9. The apparatus as claimed in claim 8, wherein the background region determiner scans each of the plurality of binary maps along predetermined scan lines to check the number of consecutive colored pixels that correspond with the predetermined scan lines, sets the consecutive colored pixels as one pixel group when the checked number of the consecutive colored pixels is greater than or equal to a threshold value, and then selects a binary map with a largest number of pixel groups set along the scan lines as the binary map comprising the background region.

10. The apparatus as claimed in claim 9, wherein the character region extractor scans the selected binary map in units of blocks of a first predetermined size, and extends to a second predetermined size when a binary pixel exists in a scanned block.

11. The apparatus as claimed in claim 10, wherein the character region extractor calculates an RGB average of a pixel region of the image, which corresponds to a binary pixel region, in the extended block of the second predetermined size, calculates a difference between the calculated RGB average and an RGB value of each pixel in the block of the first predetermined size, except the binary pixel, converts each corresponding pixel into a binary pixel when the difference calculated for the corresponding pixel is less than or equal to a threshold value, and upon completing binary pixel conversion for each pixel, reverses the binary pixel region including the converted binary pixels.

12. The apparatus as claimed in claim 1, wherein the character recognizer comprises:
a character candidate region detector for creating a binary image including a character candidate region from the image;
a character contour information acquirer for extracting a contour of the character from the character candidate region and acquiring character contour information for the extracted contour;
a character region information acquirer for setting a representative character stroke width and a representative character angle by using the acquired character contour information; and
a character region determiner for determining a region, in which the character exists, in the character candidate region by checking a ratio of an effective character stroke width and a ratio of an effective angle to the overall length of the character contour.

13. The apparatus as claimed in claim 12, wherein the character contour information acquirer extracts the contour by comparing all pixels in the binary image with a comparison mask to change brightness of pixels satisfying a comparison condition to a first predetermined brightness.

14. The apparatus as claimed in claim 13, wherein the character contour information acquirer matches each pixel in the binary image to a reference pixel located in a center of the comparison mask, and determines a corresponding pixel as a pixel satisfying the comparison condition when the corresponding pixel matched to the reference pixel has a second predetermined brightness and neighboring pixels around the corresponding pixel have a same brightness as neighboring pixels around the reference pixel.

15. The apparatus as claimed in claim 14, wherein the character contour information acquirer sets a vertical direction angle for each pixel of the extracted contour and quantizes the set vertical direction angle by a predetermined representative angle.

16. The apparatus as claimed in claim 15, wherein the character contour information acquirer sets a block region of a predetermined size, in a center of which each pixel on the contour is located, calculates direction vectors between each pixel on the contour and neighboring pixels thereof, and sets a vector value corresponding to a sum of the calculated direction vectors as the vertical direction angle of each pixel.

17. The apparatus as claimed in claim 16, wherein the character region information acquirer calculates a first character stroke width that is a distance from each pixel on the contour to a first pixel on the contour, which is opposite each pixel in the direction of a representative angle corresponding to each pixel, a second character stroke width that is a distance from each pixel to a second pixel on the contour, which is opposite each pixel in a first angle direction with respect to the representative angle, and a third character stroke width that is a distance from each pixel to a third pixel on the contour, which is opposite each pixel in a second angle direction with respect to the representative angle, sets the shortest character stroke width of the calculated first, second and third character stroke widths as the representative character stroke width, and sets the representative angle corresponding to the set representative character stroke width as the representative character angle.

18. The apparatus as claimed in claim 17, wherein the character region determiner detects a first interval, in which the representative angle is maintained constant, in the overall contour, detects a second interval, in which the representative character stroke width is maintained constant, in the detected first interval, and determines the detected second interval as a region where the character exists when a ratio of a length of the detected second interval to the overall length of the contour is greater than or equal to a predetermined threshold value.

19. A method for generating a character collage message, the method comprising the steps of:
recognizing a character from an image;
obtaining a character image, wherein the character image includes the recognized character;
storing the character image in a memory;
receiving one or more characters; and
outputting, to an output unit, the character collage message generated by substituting at least one of the received one or more characters by the character image,
wherein content of the character image is the same as the at least one of the received one or more characters.

20. The method as claimed in claim 19, further comprising creating the image by photographing a subject.

21. The method as claimed in claim 19, further comprising:
wirelessly transmitting the character collage message; and
wirelessly receiving a received character collage message.

22. The method as claimed in claim 21, wherein the character collage message that is created as a single image is wirelessly transmitted.

23. The method as claimed in claim 19, wherein recognizing the character further comprises:
creating a plurality of binary maps according to similar colors from the character candidate image;
selecting one of the plurality of binary maps that comprise a background region; and
extending and reversing the background region of the selected binary map and creating an image including a character region.

24. The method as claimed in claim 23, further comprising dividing the image into unit blocks of a predetermined size and calculating an RGB variance for each unit block,
wherein creating the character candidate image comprises, when at least one of the calculated RGB variances is greater than or equal to a predetermined variance threshold value, creating the character candidate image by excluding at least one unit block having the at least one RGB variance from the image.

25. The method as claimed in claim 24, wherein creating a plurality of binary maps comprises:
creating a color table in which a corresponding color and an RGB value thereof are mapped to each of a plurality of seed points;
calculating a difference between an RGB value for each pixel included in the character candidate image and the RGB value corresponding to each of the plurality of seed points; and
performing a seed point update for each pixel by including each corresponding pixel in a seed point associated with the smallest calculated difference.

26. The method as claimed in claim 25, wherein selecting one of the plurality of binary maps comprises:
scanning each of the plurality of binary maps along predetermined scan lines;
checking the number of consecutive colored pixels that correspond with the predetermined scan lines;
setting the consecutive colored pixels as one pixel group when the checked number of the consecutive colored pixels is greater than or equal to a threshold value; and
selecting a binary map with a largest number of pixel groups set along the scan lines as the binary map comprising the background region.

27. The method as claimed in claim 26, wherein extending and reversing the background region comprises:
scanning the selected binary map in units of blocks of a first predetermined size;
extending the block to a second predetermined size when a binary pixel exists in a scanned block;
calculating an RGB average of a pixel region of the image, which corresponds to a binary pixel region, in the extended block of the second predetermined size;
calculating a difference between the calculated RGB average and an RGB value of each pixel in the block of the first predetermined size, except the binary pixel;
converting each corresponding pixel into a binary pixel when the difference calculated for the corresponding pixel is less than or equal to a threshold value; and
upon completing binary pixel conversion for each pixel, reversing the binary pixel region including the converted binary pixels.

28. The method as claimed in claim 19, wherein recognizing the character comprises:
creating a binary image including a character candidate region from the image;
extracting a contour of the character from the character candidate region;
acquiring character contour information for the extracted contour;
setting a representative character stroke width and a representative character angle by using the acquired character contour information; and
determining a region, in which the character exists, in the character candidate region by checking a ratio of an effective character stroke width and a ratio of an effective angle to the overall length of the character contour.

29. The method as claimed in claim 28, wherein extracting the contour comprises:
comparing all pixels in the binary image with a comparison mask; and
changing brightness of pixels satisfying a comparison condition to a first predetermined brightness.

30. The method as claimed in claim 29, wherein comparing all the pixels comprises:
matching each pixel in the binary mage to a reference pixel located in a center of the comparison mask; and
determining if a corresponding pixel matched to the reference pixel has a second predetermined brightness and neighboring pixels around the corresponding pixel have a same brightness as neighboring pixels around the reference pixel.

31. The method as claimed in claim 30, wherein extracting the contour comprises:
setting a vertical direction angle for each pixel of the extracted contour; and
quantizing the set vertical direction angle by a predetermined representative angle.

32. The method as claimed in claim 31, wherein setting the vertical direction angle comprises:
setting a block region of a predetermined size, in a center of which each pixel on the contour is located;
calculating direction vectors between each pixel on the contour and neighboring pixels thereof; and
setting a vector value corresponding to a sum of the calculated direction vectors as the vertical direction angle of each pixel.

33. The method as claimed in claim 32, wherein quantizing the set vertical direction angle comprises:
calculating a first character stroke width that is a distance from each pixel on the contour to a first pixel on the contour, which is opposite to each pixel in the direction of a representative angle corresponding to each pixel, a second character stroke width that is a distance from each pixel to a second pixel on the contour, which is opposite to each pixel in a first angle direction with respect to the representative angle, and a third character stroke width that is a distance from each pixel to a third pixel on the contour, which is opposite to each pixel in a second angle direction with respect to the representative angle;
setting the shortest character stroke width of the calculated first, second and third character stroke widths as the representative character stroke width; and
setting the representative angle corresponding to the set representative character stroke width as the representative character angle.

34. The method as claimed in claim 33, wherein determining the region comprises:
detecting a first interval, in which the representative angle is maintained constant, in the overall contour;

detecting a second interval, in which the representative character stroke width is maintained constant, in the detected first interval;

determining if a ratio of a length of the detected second interval to the overall length of the contour is equal to or greater than a predetermined threshold value; and when the ratio of the length of the detected second interval to the overall length of the contour is greater than or equal to the predetermined threshold value, determining the detected second interval as a region where the character exists.

35. The apparatus as claimed in claim 1, wherein obtaining the character image comprises extracting, by the character image generator, a region from the image to create the character image.

36. The method as claimed in claim 19, wherein obtaining the character image comprises extracting a region from the image to create the character image.

\* \* \* \* \*